(12) United States Patent
Christiansson

(10) Patent No.: US 10,324,566 B2
(45) Date of Patent: *Jun. 18, 2019

(54) ENHANCED INTERACTION TOUCH SYSTEM

(71) Applicant: FlatFrog Laboratories AB, Lund (SE)

(72) Inventor: Tomas Christiansson, Torna-Hallestad (SE)

(73) Assignee: FlatFrog Laboratories AB, Lund (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,558

(22) Filed: Dec. 11, 2017

(65) Prior Publication Data

US 2018/0129354 A1 May 10, 2018

Related U.S. Application Data

(63) Continuation of application No. 14/722,526, filed on May 27, 2015, now Pat. No. 9,864,470.

(30) Foreign Application Priority Data

May 30, 2014 (SE) ...................................... 1450651

(51) Int. Cl.
*G06F 3/042* (2006.01)
(52) U.S. Cl.
CPC .......... *G06F 3/0421* (2013.01); *G06F 3/0428* (2013.01); *G06F 2203/04101* (2013.01); *G06F 2203/04109* (2013.01)
(58) Field of Classification Search
None
See application file for complete search history.

(56) References Cited

U.S. PATENT DOCUMENTS

| 3,673,327 A | 6/1972 | Johnson et al. |
| 4,254,333 A | 3/1981 | Bergstrom |
| 6,504,530 B1* | 1/2003 | Wilson .................. G06F 3/0418 345/173 |
| 6,972,753 B1 | 12/2005 | Kimura et al. |

(Continued)

FOREIGN PATENT DOCUMENTS

| WO | WO-2009/048365 A1 | 4/2009 |
| WO | WO-2009/077962 A2 | 6/2009 |

(Continued)

OTHER PUBLICATIONS

Swedish Search Report dated Dec. 22, 2014 issued in corresponding Swedish Application No. 1450651-3.

*Primary Examiner* — Christopher J Kohlman
(74) *Attorney, Agent, or Firm* — Knobbe Martens Olson & Bear, LLP

(57) ABSTRACT

A touch-sensitive apparatus includes an touch sensing part which operates a touch sensor arrangement to provide signal data representing a touch within a touch-sensing region on a front surface of a light transmissive panel; The touch-sensitive apparatus further includes a computer vision system part which operates a camera system to image a scene located externally of the touch-sensitive apparatus, and operates a computer vision controller to detect, based on image data generated by the camera system, at least one object within the scene. The touch-sensitive apparatus enables user interaction by touch control, gesture control and hover control.

18 Claims, 9 Drawing Sheets

(56) References Cited

U.S. PATENT DOCUMENTS

| | | | |
|---|---|---|---|
| 7,432,893 B2 | 10/2008 | Ma et al. | |
| 8,013,845 B2 | 9/2011 | Ostergaard et al. | |
| 8,094,136 B2 | 1/2012 | Eliasson et al. | |
| 8,928,590 B1* | 1/2015 | El Dokor | G06F 3/0233 341/22 |
| 2006/0114237 A1 | 6/2006 | Crockett et al. | |
| 2007/0075648 A1 | 4/2007 | Blythe et al. | |
| 2009/0128499 A1 | 5/2009 | Izadi et al. | |
| 2009/0153519 A1 | 6/2009 | Suarez Rovere | |
| 2011/0205186 A1* | 8/2011 | Newton | G06F 3/011 345/175 |
| 2011/0291988 A1 | 12/2011 | Bamji et al. | |
| 2013/0127790 A1* | 5/2013 | Wassvik | G06F 3/042 345/175 |
| 2013/0141388 A1* | 6/2013 | Ludwig | G06F 3/0425 345/174 |
| 2015/0215450 A1* | 7/2015 | Seo | H04L 67/22 455/566 |
| 2015/0286698 A1* | 10/2015 | Gagnier | G06F 17/30595 707/736 |

FOREIGN PATENT DOCUMENTS

| | | |
|---|---|---|
| WO | WO-2010/006882 A2 | 1/2010 |
| WO | WO-2010/015408 A1 | 2/2010 |
| WO | WO-2010/064983 A2 | 6/2010 |
| WO | WO-2010/134865 A1 | 11/2010 |
| WO | WO-2011/049511 A1 | 4/2011 |
| WO | WO-2011/139213 A1 | 11/2011 |
| WO | WO-2012/050510 A1 | 4/2012 |
| WO | WO-2012/105893 A1 | 8/2012 |
| WO | WO-2013/014534 A2 | 1/2013 |
| WO | WO-2013/036192 A1 | 3/2013 |
| WO | WO-2013/062471 A2 | 5/2013 |
| WO | WO-2013/126005 A2 | 8/2013 |
| WO | WO-2013/133756 A1 | 9/2013 |
| WO | WO-2013/133757 A2 | 9/2013 |
| WO | WO-2013/191638 A1 | 12/2013 |
| WO | WO-2014/016685 A1 | 1/2014 |
| WO | WO-2014/017973 A1 | 1/2014 |
| WO | WO-2014/098740 A1 | 6/2014 |
| WO | WO-2014/098743 A1 | 6/2014 |
| WO | WO-2014/098744 A1 | 6/2014 |

* cited by examiner

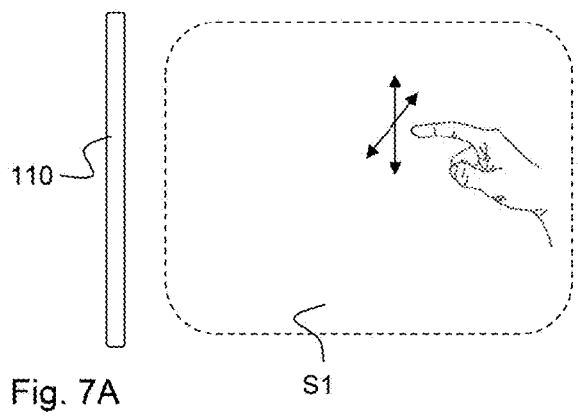
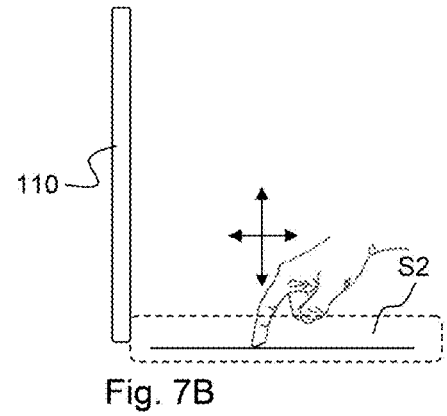
Fig. 7A  S1   Fig. 7B
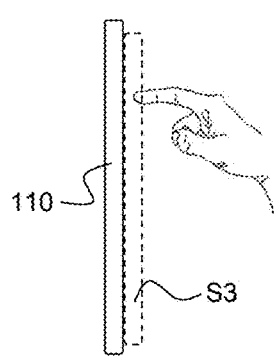
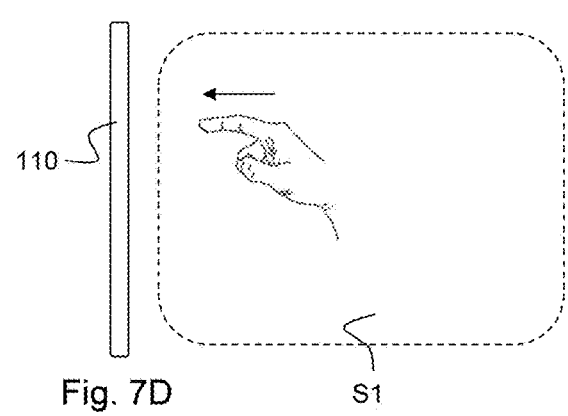
Fig. 7C   Fig. 7D  S1
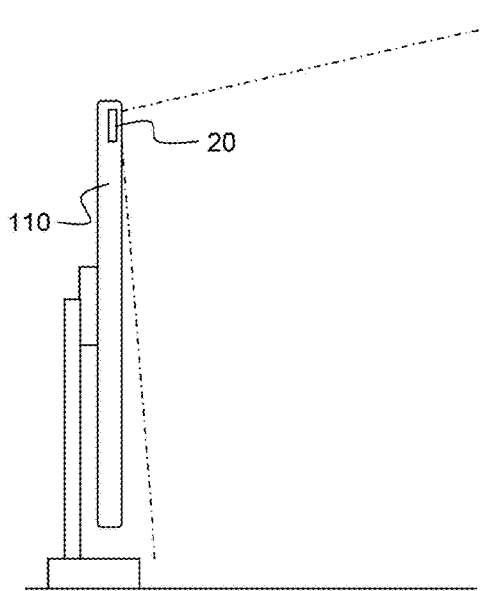
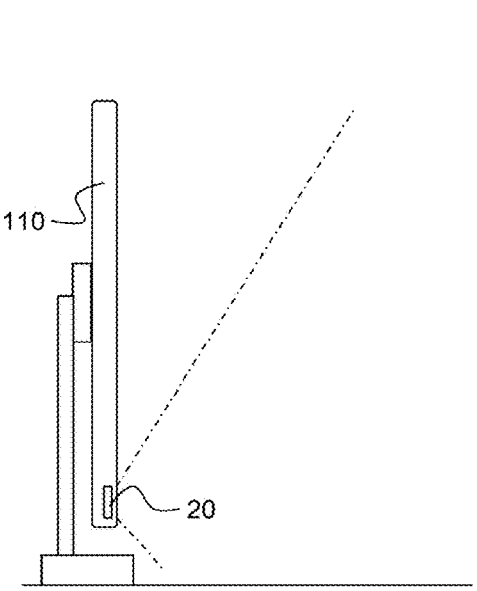
Fig. 8A   Fig. 8B

ENHANCED INTERACTION TOUCH SYSTEM

CROSS-REFERENCE TO RELATED APPLICATIONS

This application is a continuation of application Ser. No. 14/722,526 filed on May 27, 2015, which claims priority under 35 U.S.C. § 119 to Swedish patent application No. 1450651-3, filed May 30, 2014, the entire contents of each of which are hereby incorporated by reference.

TECHNICAL FIELD

The present invention relates to improvements of touch-sensing systems, including but not limited to FTIR-based touch systems of projection-type.

BACKGROUND ART

Touch-sensing systems ("touch systems") are in widespread use in a variety of applications. Typically, the touch systems are actuated by a touching object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

There are numerous known techniques for providing touch sensitivity, e.g. by incorporating resistive wire grids, capacitive sensors, strain gauges, etc into a touch panel. There are also various types of optical touch systems, which e.g. detect shadows cast by touching objects onto a touch surface, or detect light scattered off the point(s) of touching objects on a touch panel.

One specific type of optical touch system uses projection measurements of light that propagates on a plurality of propagation paths inside a light transmissive panel. The projection measurements thus quantify a property, e.g. power, of the light on the individual propagation paths, when the light has passed the panel. For touch detection, the projection measurements may be processed by simple triangulation, or by more advanced image reconstruction techniques that generate a two-dimensional distribution of disturbances on the touch surface, i.e. an "image" of everything on the touch surface that affects the measured property. The light propagates by total internal reflection (TIR) inside the panel such that a touching object causes the propagating light on one or more propagation paths to be attenuated by so-called frustrated total internal reflection (FTIR). Hence, this type of system is an FTIR-based projection-type touch system (abbreviated "FTIR system" in the following). Examples of such FTIR systems are found in U.S. Pat. Nos. 3,673,327, 4,254,333, 6,972,753, 4, US2006/0114237, US2007/0075648, WO2009/048365, US2009/0153519, WO2010/006882, WO2010/064983, WO2010/134865, WO2012/105893, WO2013/014534, WO2013/191638, WO2014/016685, and WO2014/017973.

FTIR systems offer a number of technical advantages, which may be enhanced by proper implementation. FTIR systems are scalable to large sizes at a relatively modest cost, since the number of optoelectronic components (light emitters and light detectors) scale at most linearly with panel size. Furthermore, FTIR systems require no special sensing elements to be dispersed within or beneath the panel and thus provides a clear and unobstructed view of an underlying display. This may improve contrast and brightness of displayed content and/or enable a reduced power consumption for the display. Still further, FTIR systems readily handle multi-touch events, which means that multiple touch events occur simultaneously. FTIR systems also enable a high resolution at a relatively low cost, since the resolution is determined by the density of propagation paths and the downstream signal processing for recreating the image of the disturbances on the touch surface. Another fundamental advantage of FTIR systems is that only objects in contact with the light transmissive panel affect the propagating light. Thus, the touch sensing is essentially unaffected by objects in the surroundings of the panel, e.g. casting shadows on the panel.

An alternative optical touch-sensing technique based on light scattering is known from U.S. Pat. Nos. 8,013,845 and 8,094,136. This technique is based on a light transmissive panel implemented as a multilayered waveguide. One or more light emitters are arranged to illuminate objects that are located in contact with or above the top surface of the waveguide. Thereby, the objects scatter the illuminating light. The waveguide has a signal layer which is spaced from the top surface and optically connected to light detectors. Dedicated microstructures are dispersed across a further layer within the waveguide to guide part of the scattered light into the signal layer such that it is trapped within the signal layer by total internal reflection (TIR) and propagates to the light detectors. The light detectors are configured to indicate the direction and the intensity of the received light. The location of the object in a plane parallel with the top surface may be calculated by triangulation and the distance to the object from the top surface may be calculated based on the light intensity.

While the light scattering technique shares some of the advantages of FTIR systems, it is less capable of handling multi-touch events and the provision of dispersed microstructures may impair the visibility of an underlying display. However, the light scattering technique has the advantage over FTIR systems of being able to not only determine the 2D position of touching objects on the top surface, but also the 3D position of non-touching objects above the top surface. However, in practice it may be difficult to disambiguate between touching and non-touching objects at high precision using the light scattering technique.

Irrespective of the technique used for providing touch sensitivity, most touch systems are in practice limited to detecting objects in contact with the touch surface. They typically have a poor ability of detecting objects that are significantly spaced from the touch surface and/or to determine the distance of non-touching objects to the touch surface with sufficiently high precision.

SUMMARY

It is an objective of the invention to at least partly overcome one or more limitations of the prior art.

Another objective is to enhance the ability of users to interact with a touch system.

One or more of these objectives, as well as further objectives that may appear from the description below, are at least partly achieved by means of a touch-sensitive apparatus, a method, and a computer-readable medium according to the independent claims, embodiments thereof being defined by the dependent claims.

A first aspect of the invention is a touch-sensitive apparatus, comprising: a light transmissive panel that defines a front surface and an opposite, rear surface; a touch sensor arrangement configured to be responsive to touches within a touch-sensing region on the front surface; a touch controller operable to determine, based on signal data from the touch sensor arrangement, a location of a touch within the touch-sensing region; a camera system being operable to image a scene located externally of the touch-sensitive apparatus; and a computer vision controller operable to detect, based on image data generated by the camera system, at least one object within the scene.

The first aspect provides the functionality of detecting touches on the front surface of the light transmissive panel and the functionality of detecting objects spaced from the front surface. Accordingly, the first aspect enables enhanced user interaction with the touch-sensitive apparatus. Apart from interacting by touches, e.g. on a user interface generated by a display device disposed behind the front surface, the user may be given the ability to interact with the user interface/apparatus by gestures at a larger distance from the front surface and by hover in close proximity to the front surface.

A further advantage of the apparatus of the first aspect is that the detection of objects externally of the apparatus is functionally separated from the detection of touches on the front surface. This means that the system parts dedicated to touch detection (touch controller, touch sensor arrangement) and object detection (computer vision controller and camera system) can be separately optimized for their respective task, to achieve a better performance of the apparatus as a whole.

In one embodiment, the camera system may be disposed to optically face the rear surface of the light transmissive panel and operable to image a scene located externally of the touch-sensitive apparatus through the light transmissive panel.

The arrangement of the camera system to image the scene through the light transmissive panel offers a number of technical advantages. The camera system, and the computer vision controller, may be protected within a housing of the apparatus together with the touch sensor arrangement and the touch controller, while the front surface of the light transmissive panel is arranged in the housing to define an external surface of the apparatus. The user will interact with the apparatus by touching the front surface, and the camera system can thus be conveniently located to optically face the space occupied by the user and thereby image a relevant part of this space. The camera system may easily be hidden from the user of the apparatus, e.g. by disposing an optical filter which is non-transmissive to visible light between the camera system and the rear surface and configuring the camera system to image the scene using non-visible light. Thus, the camera system may be installed without affecting the external appearance of apparatus and without imposing any major limitations on the visual design of the apparatus. Further, the camera system and/or the computer vision controller may be electrically connected to make use of the electrical infrastructure for supplying power and/or transferring data signals to and from the system part for touch detection.

As will be further described herein, a number of synergistic effects are enabled by the provision of computer vision in combination with touch detection, including improved power management of the apparatus and improved performance of the touch detection.

In one embodiment, the computer vision controller is operable to determine a position of the object in three dimensions externally of the touch-sensitive apparatus.

In one embodiment, the computer vision controller is operable to match the position of the object to one or more control spaces with a predefined extent externally of the touch-sensitive apparatus.

The one or more control spaces may comprise a proximity control space, which overlaps and is located proximate to at least part of the touch-sensing region. For example, the proximity control space may extend no more that 50 mm from the front surface. In one embodiment, the computer vision controller is configured to associate a movement pattern of the object within the proximity space with a hover gesture.

Alternatively or additionally, the one or more control spaces may comprise a gesture control space, which is spaced from the front surface by at least 50 mm. The gesture control space may be located in front of the touch-sensitive region. In one embodiment, the computer vision controller is configured to associate a movement pattern of the object within the gesture control space with a control gesture for controlling the operation of the touch-sensitive apparatus. The control gesture may be associated with one of: controlling a power setting of the touch-sensitive apparatus, and interacting with a user interface generated by a display device disposed beneath the light transmissive panel.

Alternatively or additionally, the one or more control spaces may comprise a keyboard control space, which is defined with respect to an expected position of a keyboard for data entry to the touch-sensitive apparatus. In one embodiment, the computer vision controller is configured to associate a movement pattern of the object within the keyboard control space with one of a key tap in a direction towards the expected position of the keyboard, and a control gesture in a geometric plane extending generally parallel to the expected position of the keyboard.

In one embodiment, the touch-sensitive apparatus is configured to set a power consumption of at least one of the touch controller and the touch sensor arrangement, based on the position of the at least one object in relation to the one or more control spaces.

In one embodiment, the computer vision controller is configured to determine a movement pattern of the at least one object within the scene, match the movement pattern to a set of predefined gestures, and generate a gesture command associated with one of the predefined gestures. The computer vision controller may be configured to determine the movement pattern and/or match the movement pattern to the predefined gestures provided that the at least one object fulfills at least one constraint defined by at least one of: a size, a position, an orientation, a movement history, an object count, and an inter-object spacing.

In one embodiment, the computer vision controller is configured to detect that the at least one object is moving towards the front surface. The computer vision controller is configured to, when detecting that the at least one object is moving towards the front surface, disable a process of detecting gestures based on movement of the at least one object. Alternatively or additionally, the touch-sensitive apparatus may be configured to, when the computer vision controller detects that the at least one object is moving towards the front surface, increase the power consumption of at least one of the touch controller and the touch sensor arrangement.

In one embodiment, the touch-sensitive apparatus is configured to decrease the power consumption of at least one of the camera system and the computer vision controller if the touch controller indicates presence of a touch within the touch-sensing region.

In one embodiment, the computer vision controller is operable to detect and signal presence or absence of the object within the scene. The touch-sensitive apparatus may be configured to enter a low power mode when the computer vision controller indicates absence of the at least one object within the scene, and may be configured to enter a high power mode when the computer vision controller indicates presence of the at least one object within the scene.

In one embodiment, the computer vision controller is configured to discriminate between an object spaced from the touch-sensing region and an object in contact with the touch-sensing region. The touch-sensitive apparatus may be configured to cause the touch controller to initiate a calibration procedure while the computer vision controller indicates absence of an object in contact with the touch-sensing region, which calibration procedure operates to determine the distribution of deposits on the front surface within the touch-sensing region. Alternatively or additionally, the touch-sensitive apparatus may be configured to match a position of the object in contact with the touch-sensing region, as determined by the computer vision controller, with the location of the touch in the touch-sensing region, as determined by the touch controller. The touch-sensitive apparatus may be further configured to assign a unique identifier to the at least one object and/or a user of the at least one object, said user being detected by the computer vision controller.

In one embodiment, the computer vision controller is configured to, based on the image data, obtain a depth image comprising 3D (three-dimensional) points, each 3D point being associated with a depth value which is indicative of a distance from a predefined origin to a respective location in the scene. The computer vision controller may be further configured to process the 3D points for determination of distance values for a set of predefined cells within the touch-sensing region, each distance value representing a distance perpendicular to the respective cell. Alternatively or additionally, the computer vision controller may be configured to validate the respective 3D point based on the intensity value of a corresponding pixel in a digital grayscale image of the scene. The digital grayscale image may be included in the image data generated by the camera system. Pixels in the digital grayscale image may correspond to the 3D points in the depth image and be associated with a respective intensity value.

In one embodiment, the camera system comprises one of: a stereoscopic camera system disposed to capture images of the scene from at least two different directions; a structured light camera system configured to project a predetermined pattern of light onto the scene and capture images of the predetermined pattern of light within the scene from at least one direction; and a time-of-flight camera system configured to measure the time of flight of a light signal from the time-of-flight camera system to different locations in the scene.

In one embodiment, the touch sensor arrangement comprises light emitters and light detectors disposed on the light transmissive panel along a perimeter of the region, wherein the light emitters are disposed to generate light beams that propagate across the region by total internal reflection inside the panel on a plurality of propagation paths to the light detectors, the light transmissive panel being configured such that a touch on the front surface within the region causes an attenuation of the light received by the light detectors on one or more of the propagation paths.

In one embodiment, the camera system and the light detectors are responsive to light in a common wavelength region. Alternatively and additionally, the camera system may comprise an illuminating light source operable to illuminate the scene, and an imaging sensor operable to capture an image of the scene when illuminated by the illuminating light source, wherein the illuminating light source and the light emitters may be configured to emit light in a common wavelength region. The illuminating light source and the imaging sensor may be included in a unitary camera module.

In one embodiment, the touch-sensitive apparatus is operable to separate in time the activation of the camera system to image the scene and the activation of the light emitters to generate the light beams for propagation on the plurality of propagation paths to the light detectors.

In one embodiment, the light emitters and the light detectors are optically coupled to the rear surface of the light transmissive panel along a border region surrounding the touch-sensitive region, as seen in a direction normal to the rear surface, and the camera system is disposed within said border region, as seen in a direction normal to the rear surface. The border region may be rectangular and the camera system may be disposed centrally along a side of the border region. Alternatively or additionally, the border region may comprise an optical filter which is configured to transmit at least a portion of the light emitted by the light emitters while blocking visible light, and the light emitters and the light detectors may be optically coupled to the rear surface via the optical filter, and the camera system may be optically coupled to the rear surface via the optical filter.

In one embodiment, the light emitters and the light detectors are electrically connected to at least one printed circuit board with electrically conducting structures for at least one of power transfer and data signaling, and the camera system is electrically connected to said electrically conducting structures of the at least one printed circuit board.

In one embodiment, the touch-sensitive apparatus further comprises: a display device, a housing integrated with the light transmissive panel such that the touch-sensitive region defines an externally facing surface in front the display device, a display controller operatively connected to the display device, and a main controller operatively connected to the display controller, wherein the touch controller and the computer vision controller are operatively connected to supply touch data indicative of the location of said touch and object data indicative of said at least one object, respectively, to the main controller, and wherein the main controller is configured to control the display device, via the display controller, to display a user interface in response to the touch data and the object data.

In one embodiment, the touch-sensitive apparatus is any one of: a laptop computer, a mobile telephone, a desktop computer, a tablet computer, a television set, a gaming console, and an interactive table.

A second aspect of the invention is a method of operating a touch-sensitive apparatus, said method comprising: operating a touch sensor arrangement to provide signal data representing a touch within a touch-sensing region on a front surface of a light transmissive panel; operating a touch controller to determine, based on the signal data, a location of the touch within the touch-sensing region; operating a camera system to image a scene located externally of the touch-sensitive apparatus; and operating a computer vision controller to detect, based on image data generated by from the camera system, at least one object within the scene.

A third aspect of the invention is a computer-readable medium comprising program instructions which, when executed by a processing unit, is adapted to carry out the method according to the second aspect.

Any one of the above-identified embodiments of the first aspect may be adapted and implemented as an embodiment of the second and third aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIGS. 7A-7D illustrate different user interactions in control spaces of a CV-FTIR system.

FIGS. 8A-8B illustrate different placements of a CV camera in a CV-FTIR system.

DETAILED DESCRIPTION OF EXAMPLE EMBODIMENTS

Figure 1:
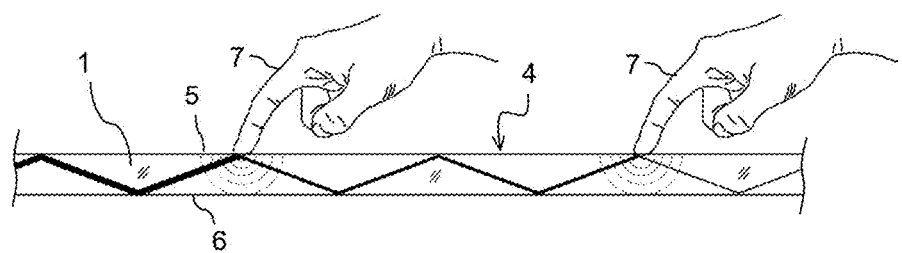
FIG. 1 is a section view of a light transmissive panel using FTIR for touch detection.

Embodiments of the invention are exemplified in the context of FTIR-based touch systems of projection-type. Throughout the description and drawings, the same reference numerals are used to identify corresponding elements.

As used herein, a "light emitter" may be any type of device capable of emitting radiation in a desired wavelength range, for example a diode laser, a VCSEL (vertical-cavity surface-emitting laser), an LED (light-emitting diode), an incandescent lamp, a halogen lamp, etc. A light emitter may also be formed by the end of an optical fiber. The light emitter may generate light in any wavelength range. In the examples herein, light is generated in the near infrared (NIR), i.e. at wavelengths of about 750 nm-1400 nm. However, light may be generated in other wavelength ranges, including a visible range (VIS), ultraviolet range (UV) or far infrared range (FIR).

Analogously, a "light detector" or "light sensor" may be any device capable of converting light into an electrical signal, such as a photo-detector, a CCD device, a CMOS device, etc. The light detector/sensor may be responsive to the light generated by the light emitter. Alternatively the light detector/sensor may be responsive to a different wavelength range, e.g. if the light from the light emitter is subject to a wavelength conversion before reaching the light detector.

FIG. 1 illustrates the concept of touch detection based on attenuation of propagating light, commonly denoted FTIR (Frustrated Total Internal Reflection).

According to this concept, light is transmitted inside a panel 1 along a plurality of well-defined propagation paths. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, and the front surface 5 allows the propagating light to interact with touching objects 7 and thereby defines a touch surface 4. The interaction is enabled by injecting the light into the panel 1 such that the light is reflected by total internal reflection (TIR) in the front or top surface 5 as it propagates through the panel 1. The light may be reflected by TIR in the bottom or rear surface 6 or against a reflective coating thereon. It is also conceivable that the propagation channel is spaced from the rear or bottom surface 6, e.g. if the panel comprises multiple layers of different materials. The panel 1 may thus be made of any solid material (or combination of materials) that transmits a sufficient amount of light in the relevant wavelength range to permit a sensible measurement of transmitted energy, e.g. glass, poly(methyl methacrylate) (PMMA) and polycarbonates (PC). The panel 1 may be designed to be overlaid on or integrated into a display device or monitor (not shown).

As shown in FIG. 1, an object 7 that is brought into close vicinity of, or in contact with, the touch surface 4 may interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local attenuation or "frustration" of the total internal reflection, which leads to a decrease in the energy (or equivalently, the power or intensity) of the transmitted light, as indicated by the thinned lines downstream of the touching objects 7 in FIG. 1.

Figure 2:
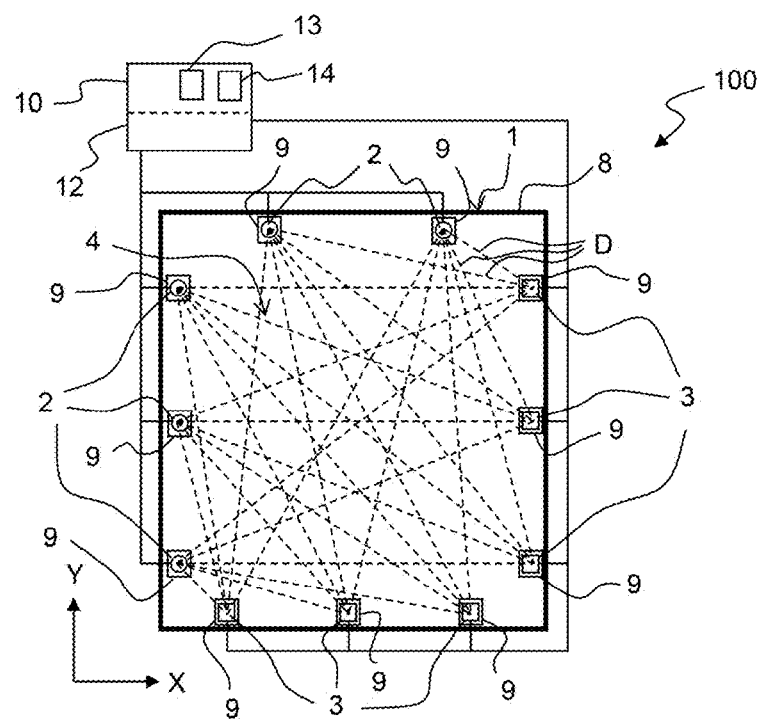
FIG. 2 is a top plan view of an FTIR system.

FIG. 2 illustrates an example embodiment of a touch system that is based on the concept of FTIR. Emitters 2 (represented by open circles herein) are distributed along the perimeter of the touch surface 4 to project light onto the panel 1 such that at least part of the light is captured for propagation by internal reflections in the propagation channel. Detectors 3 (represented by open squares herein) are distributed along the perimeter of the touch surface 4 and optically coupled to the panel 1 so as to receive part of the propagating light. The light from each emitter 2 will form a diverging beam of light inside the panel, i.e. a beam that diverges in the plane of the panel 1 as it propagates in the propagation channel. Thereby, the light from each emitter propagates to a plurality of detectors 3 on a plurality of light propagation paths D, as shown in FIG. 2. Even if the light propagation paths D correspond to light that propagates by internal reflections inside the panel 1, the light propagation paths D may conceptually be represented as "detection lines" that extend across the touch surface 4 between pairs of emitters 2 and detectors 3, as indicated by dotted lines in FIG. 2. Thus, the detection lines correspond to a projection of the propagation paths onto the touch surface 4. Thereby, the emitters 2 and detectors 3 collectively define a grid of detection lines ("detection grid") on the touch surface 4, as seen in a top plan view. It is appreciated that FIG. 2 is an example, and that a (significantly) larger number of emitters 2 and/or detectors 3 may be included in the touch system 100 and that other arrangements of the emitters 2 and detectors 3 are conceivable.

The touch system 100 is thus an FTIR-based projection-type touch system, in which touches are sensed and quantified based on measurements of light that has been projected across the panel 1, inside the propagation channel, from a number of different directions. In the following, this type of touch system is denoted "FTIR system".

Light is coupled into and out of the panel 1 at ports, which are distributed around the touch surface 4. The ports may be located on the front surface 5, the rear surface 6, or the edge surface 8 that connects the front and rear surfaces 5, 6. The emitters 2 and detectors 3 are preferably arranged beneath or level with the panel 1, so that they are shielded when the panel 1 is installed in a supporting frame or housing of a host device (cf. FIG. 5A). The ports may be defined by dedicated coupling elements 9, which ensure that light from the emitters 2 is captured in the radiation propagation channel and that light propagating in the propagation channel reaches the detectors 3. The coupling elements 9 may be implemented as larger prisms or wedges, e.g. as described in U.S. Pat. No. 7,432,893, as miniaturized light re-directing components as described in WO2013/036192, or as optical films or sheets, e.g. as described in WO2012/105893, WO2013/191638 and WO2014/017973. Further variants of coupling elements are disclosed in PCT/SE2013/051532, PCT/SE2013/051535, PCT/SE2013/051537, all filed on Dec. 17, 2013. The FTIR system 100 may also include structures for reducing the amount of ambient light that falls on the detectors 3, as well as structures for hiding the emitters 2, detectors 3 and coupling elements 9 from view through the front surface 5.

The detectors 3 provide measurement signals, also denoted "projection signals", each representing the energy of light received by a certain light detector 3 from a certain light emitter 2. The projection signals represent the energy, intensity or power of light received by the detectors 3 on the individual detection lines D. Whenever an object touches a detection line, the received energy on this detection line is decreased ("attenuated").

Figure 3:
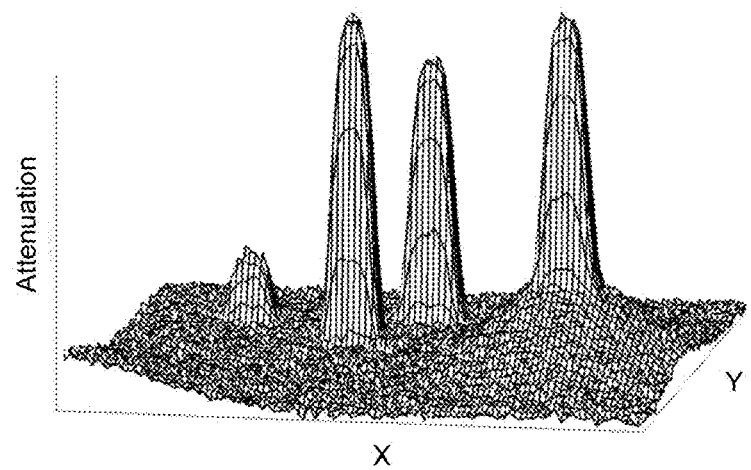
FIG. 3 is a 3D plot of an attenuation pattern generated based on energy signals from an FTIR system.

A touch controller 10 may be configured to process the projection signals so as to determine a property of the touching objects, such as a position (e.g. in the XY coordinate system shown in FIG. 2), a shape, or an area. This determination may involve a straight-forward triangulation based on the attenuated detection lines, e.g. as disclosed in U.S. Pat. No. 7,432,893 and WO2010/015408, or a more advanced processing to recreate a distribution of attenuation values (for simplicity, referred to as an "attenuation pattern") across the touch surface 1, where each attenuation value represents a local degree of light attenuation. An example of such an attenuation pattern is given in the 3D plot of FIG. 3, where the peaks of increased attenuation represent touching objects. The attenuation pattern may be further processed by the touch controller 10 for determination of a position, shape or area of touching objects. The attenuation pattern may be generated e.g. by any available algorithm for image reconstruction based on projection signal values, including tomographic reconstruction methods such as Filtered Back Projection, FFT-based algorithms, ART (Algebraic Reconstruction Technique), SART (Simultaneous Algebraic Reconstruction Technique), etc. Alternatively, the attenuation pattern may be generated by adapting one or more basis functions and/or by statistical methods such as Bayesian inversion. Examples of such reconstruction functions designed for use in touch determination are found in WO2009/077962, WO2011/049511, WO2011/139213, WO2012/050510, WO2013/062471, WO2013/126005, WO2013/133756 and WO2013/133757, all of which are incorporated herein by reference.

In FIG. 2, the FTIR system 100 also includes an activation controller 12 which is connected to selectively control the activation of the emitters 2 and, possibly, the readout of data from the detectors 3. Depending on implementation, the emitters 2 and/or detectors 3 may be activated in sequence or concurrently, e.g. as disclosed in WO2010/064983. One or both of the touch controller 10 and the activation controller 12 may be at least partially implemented by software stored in a memory unit 13 and executed by a processing unit 14.

Figure 4:
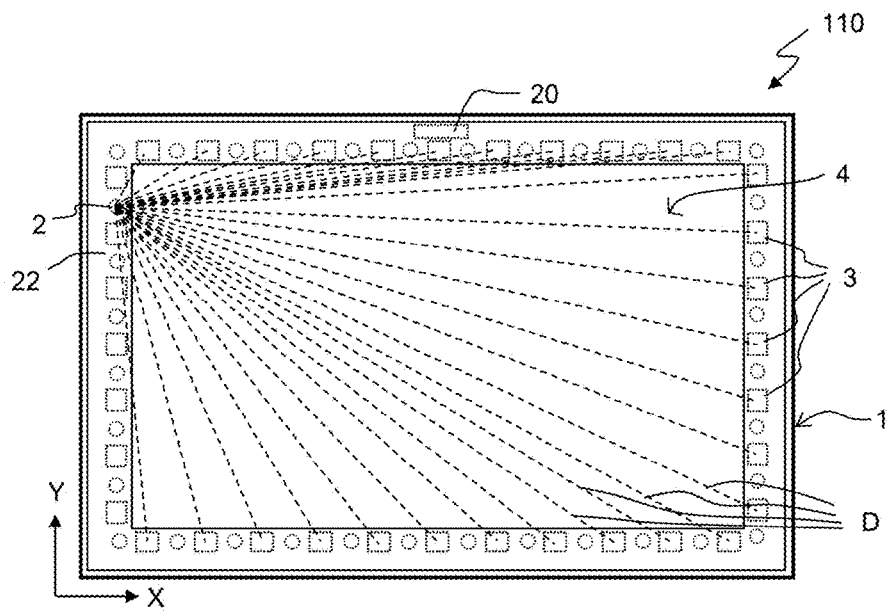
FIG. 4 is a top plan view of a CV-FTIR system.

An embodiment of a computer-vision enhanced FTIR system 110 (CV-FTIR system) is shown in FIG. 4. The CV-FTIR system 110 includes an FTIR system part which generally operates as described above with reference to FIGS. 1-3. For the purpose of illustration only, FIG. 4 schematically indicates detection lines D that are defined between one emitter 2 on one side of the touch surface 4 and the detectors 3 on the other sides of the touch surface 4.

The CV-FTIR system 110 further includes a computer vision (CV) system part that comprises a camera system 20 which is installed beneath the rear surface 6 to produce images, via the panel 1, of the surroundings of the system 110, specifically images of a scene in front of the front surface 5. The CV system part is thereby operable to detect and track objects above the front surface 5 and enables users to interact with the system 110 without touching the surface 5, e.g. by gesture control and/or by hover. The term "gesture control" designates user interaction by gestures (mainly hands and fingers) at a distance from the front surface 5 (e.g., ranging from decimeters to meters). The term "hover" refers to gestures and pointing above the front surface 5 when the distance is small (e.g. ranging from millimeters to a few centimeters). Compared to the FTIR system 100, the CV-FTIR system 110 offers enhanced interaction capabilities, through use of both touch control, gesture control and hover. By the CV system part, gesture control and hover is enabled without requiring any adaptation of the FTIR system part. However, as will be explained in further detail below, it is possible to improve the performance of FTIR system part, using information from the CV system part. Also, information from the CV system part may be used to improve the power management of the CV-FTIR system 110.

Figure 5A:
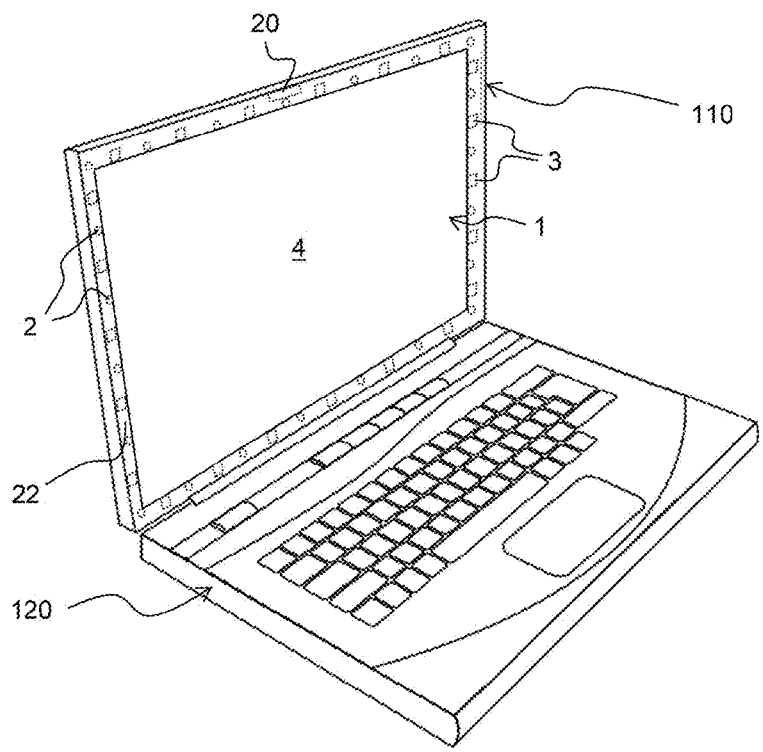
FIGS. 5A-5B are perspective and side view of a host device with an integrate CV-FTIR system.

The CV-FTIR system 110 in FIG. 5A includes a border or frame 22 of a material which extends around the touch surface 4 and is non-transmissive to visible light. The border 22 is arranged above the emitters 2, detectors 3 and coupling elements (not shown) to hide these and other components from view through the front surface 5. In one embodiment that enables the front surface 5 to be more or less perfectly planar ("flush"), the hiding border 22 is applied to the rear surface 6 and is configured to be transmissive to at least part of light generated by the emitters 2, e.g. in the NIR. The camera system 20 is also hidden beneath the border 22 and thus needs to be responsive to non-visible light. In one embodiment, the camera system 20 is responsive to light in the same wavelength region as the detectors 3, which enables the use of the same material for the entire border 22. Thereby, manufacture and installation of the border 22 is facilitated. This embodiment may also facilitate manufacture and installation of further optical films that may need to be optimized for a certain wavelength region, such as interference filters and anti-reflective coatings.

The camera system 20 is arranged to produce images of a scene externally of the CV-FTIR system 110. The "scene" corresponds to the field of view of the camera system 20. The camera system 20 outputs a time sequence of image data that represents the scene. Depending on the type of camera system, this image data may be in the form of digital grayscale images of the scene, or a processed version of such grayscale images. As used herein, grayscale images include color images.

In one embodiment, the CV system part is configured to detect objects within the scene using a digital "depth image", which forms a 2D matrix of pixels with each pixel having a pixel value that represents the distance from the pixel to a corresponding location in the scene. In other words, the depth image contains three-dimensional information about the scene. The provision of a depth image has been found to facilitate and improve the task of distinguishing between different objects within the scene. The camera system 20 may be configured to generate image data in the form of depth images. Alternatively, the depth images may be generated by a computer vision (CV) controller that receives digital grayscale images from the camera system 20.

In one embodiment, the CV system part is implemented as a time-of-flight (TOF) system. A TOF system is a range imaging system that resolves distance based on the known speed of light, measuring the time-of-flight of a light signal between the camera system and the scene for each point of the image. Thus, the camera system 20 includes a light emitter which is operable to illuminate the scene, and an imaging detector which is operable to detect back-scattered light from the scene. The depth image may be generated, by the camera system 20 or the CV controller, by directly or indirectly measuring the time of flight between emission and detection. There are a number of commercially available implementations that may be used, including RF-modulated light sources with phase detectors, range gated imagers and direct TOF imagers.

In another embodiment, the CV system part is implemented as a stereoscopic system, which generates a depth image by correlating two (or more) grayscale images taken from two different positions. Thus, the camera system 20 may include two imaging detectors. Alternatively, the CV-FTIR system 110 includes two (or more) camera systems 20 with one camera each. The camera system 20 may or may not include a light source for illuminating the scene.

In yet another embodiment, the CV system part is implemented as a structured light system, which projects a known pattern of pixels on to the scene and calculates depth and surface information of the objects in the scene based on the deformation of the pattern. Thus, the camera system 20 includes a light emitter which is operable to illuminate the scene with the known pattern, and an imaging detector which is operable to detect back-scattered light from the scene.

FIG. 5A is a perspective view of a host device 120 implemented as a laptop computer with an integrated CV-FTIR system 110. To the user of the host device 120, all optoelectronic components of the CV-FTIR system 110 are hidden from view behind the border 22. A display with a user interface (UI) is visible through the touch surface 4. The host device 120 need not be a laptop computer, but could be any type of computing device or image display device, such as a mobile telephone, a desktop computer, a tablet computer, a television set, a gaming console, an interactive table, etc.

Figure 5B:
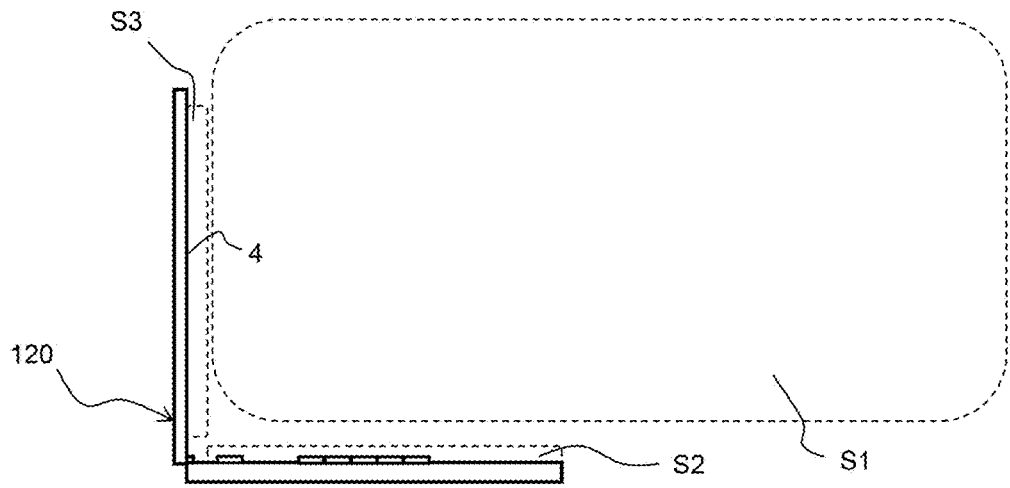

FIG. 5B is a side view of the laptop computer 120 in FIG. 5A and illustrates different control spaces S1, S2, S3 that may be viewed and defined by the CV-FTIR system 110. It should be understood that the CV-FTIR system 110 need not define all the spaces S1-S3 and that the extent of the respective space S1-S3 is merely an example. The control spaces S1-S3 may be given by a respective subset of the scene that is imaged by a single camera system 20, or by different scenes that are imaged by different camera systems 20.

As will be further explained, the CV system part may apply different techniques in different control spaces to process the image data for object detection and/or tracking objects over time. Further, the CV system part may assign different types of user interaction to different control spaces. In FIG. 5B, S1 is a gesture control space, S2 is a keyboard control space, and S3 is a hover control space. The keyboard control space S2 is generally defined with respect to the expected location of a keyboard or similar input device. For example, the space S2 may extend generally perpendicularly to the front surface 5 and be shifted away from the front surface 5 in a direction parallel thereto. The hover control space S3 may e.g. be defined to extend within 50 mm from the front surface, such as between 0-40 mm or 5-35 mm from the front surface. The gesture control space S1 may e.g. be defined to extend at least 50 mm from the front surface, e.g. between the distance limits 10-100 cm or 30-70 cm from the front surface. The distance limits for the gesture control space S1 may be set in relation to the expected use of the host device. For example, the extent of the gesture control space S1 may differ between a television set and a laptop computer. Further, the outer distance limit may be set to ensure that the CV system part is able to determine the distance to objects with adequate accuracy. Generally, the accuracy drops at long distances from the camera system 20.

Figure 6:
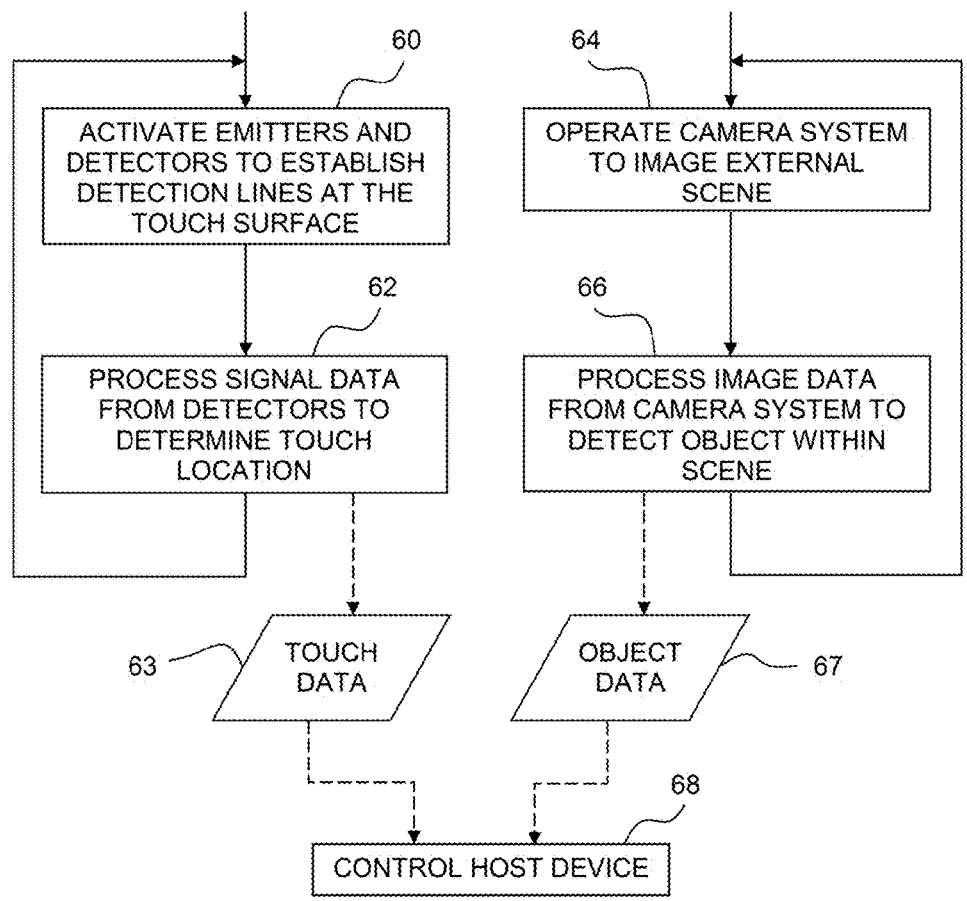
FIG. 6 is a flow chart of a process in a CV-FTIR system.

FIG. 6 is an example of a process executed in a host device 120 that contains a CV-FTIR system 110. The FTIR system part repeatedly executes steps 60, 62 to produce touch data 63. In step 60, the emitters 2 are activated to propagate light inside the panel 1 and the detectors 3 are operated to generate measurement signals representing the amount of the light received on the different detection lines D (cf. FIGS. 2 and 4). As noted above, the emitters 2 may be activated one by one in sequence and/or at least partly simultaneously. In step 62, the signal data from the detectors 3 is processed to determine the location of touches (if any) on the touch surface 4, e.g. by generating and processing an attenuation pattern (cf. FIG. 3). The location of the touches may be given in a coordinate system associated with the touch surface 4 (cf. XY in FIGS. 2 and 4). The touch data 63 may form a time-sequence of positions for each touch on the touch surface 4 (also known as a "trace" in the art). In addition to positions (XY coordinates), the touch data may include one or more of a size value, a pressure value and an attenuation value for the respective touch. The CV system part repeatedly executes steps 64, 66 to produce object data 67. In step 64, the camera system 20 is operated to generate image data representing the scene outside of the host device 120. In step 66, the image data is processed for detection of objects (if any) within the scene. The object data 67 may include a position of the respective object. The touch data 63 and the object data 67 are then obtained by a control process 68 for controlling the operation of the host device 120.

It should be noted that the FTIR steps 60, 62 and the CV steps 64, 66 may be executed at different repetition rates, and that these repetition rates may be selectively modified during operation of the host device. Further, while the FTIR steps 60, 62 and the CV steps 64, 66 may be executed in parallel, it may be desirable to separate steps 60 and 64 in time, at least to avoid that the camera system 20 is activated at the same time as the light emitters 2 and light detectors 3. A time-separation may reduce the risk of electromagnetic interference between the FTIR and CV system parts. Furthermore, the time-separation may reduce the risk that light generated by one system part interferes with the light detection of the other system part, which may be a particular problem if the FTIR and CV system parts are responsive to light in the same wavelength region.

FIGS. 7A-7D illustrate objects that are located in the control spaces S1-S3. As noted above, the CV system part may apply different rules for interpreting objects dependent on control space. If one or more objects are identified in space S1, as shown in FIG. 7A, the CV system part may track the location of the object(s) over time and match the resulting movement pattern to predefined control gestures. The predefined control gestures may include gestures for controlling the status of the host device and/or the FTIR system part and/or the CV system part, e.g. entering a low power mode or a high power mode. The predefined control gestures may also include gestures for interacting with a user interface generated by display device beneath the panel 1 (cf. 130 in FIG. 15), e.g. a gesture for moving an item within the user interface (translating, rotating, etc), a gesture for moving the user interface or an item of the user interface (e.g. panning, flicking, scrolling, etc), a gesture for selecting an item in the user interface, a gesture for changing the zoom level of the user interface (pinching, stretching, etc), a gesture for controlling audio, a gesture for controlling machine settings of the display device (brightness, contrast, color, etc).

It should be realized that gesture commands may be erroneously triggered by movements in space S1, e.g. if the user reaches to touch the touch surface 4. This is not an unlikely scenario for a CV-FTIR system. The CV system part may apply one or more constraints in space S1 to reduce this risk. One such constraint is to require that gestures are formed by at least two objects, e.g. two hands or two fingers. Another constraint is to only identify gestures for objects that move in a geometric plane which is significantly non-perpendicular, or even essentially parallel, to the touch surface 4. The CV system part may also block gesture identification whenever an object is detected to move in a direction towards the touch surface 4, e.g. as shown in FIG. 7D. Another constraint is make the start of the gesture significantly different from a movement typically associated with a user reaching to touch the touch surface. This may be implemented by use of a 'lock-in' stage followed by a tracking stage. The lock-in stage may comprise positioning an object in front of the display then maintaining the object's position unmoving for a period of time before beginning the gesture. This allows the CV-FTIR system to more positively identify the object as a gesture object rather than a user reaching to touch the touch surface.

If one or more objects are identified in space S2, as shown in FIG. 7B, the CV system part may track the location of the object(s) over time. Space S2 may be dedicated to input by gestures and/or by keyboard emulation, and the system may match object movements in three dimensions to dedicated gestures. For example, the user may tap key icons drawn on a keyboard mat which is placed on a desk surface in space S2, and the system matches each tap to the respective key icon. In other example, the user may move one or more fingers on the desk surface, and the system matches the movement to a set of predefined control gestures. In another example, the system may be configured to identify predefined control gestures made by the user in a horizontal plane above a regular keyboard, which is arranged in or beneath the space S2. These control gestures may be any of the above-mentioned control gestures for space S1. To avoid keyboard taps from being interpreted as gestures, the space S2 may be located above the expected position of the users fingers on the keyboard, if present.

If one or more objects are identified in space S3, as shown in FIG. 7C, the CV system part may track the location of the object(s) over time and cause the display device to take dedicated action when the resulting movement pattern indicates that the object lingers at a certain position or area above the touch surface 4. Such action may include showing content related to existing content in the user interface at the position/area.

The camera system 20 may be placed anywhere behind the panel 1, but is preferably located outside the touch surface 4 and behind the hiding border 22, if present. The placement of the camera system 20 may however be optimized with respect to the intended use of CV-FTIR system. For example, if the CV-FTIR system 110 is intended to be arranged at an angle to a support surface, e.g. on a desk, the camera system 20 may be centered at the top of the CV-FTIR system 110. This placement may avoid that items on the support surface obstruct the field of view of the camera system 20. Such an installation is illustrated in FIG. 8A, in which the dashed lines indicate the field of view. On the other hand, if the CV-FTIR system 110 is intended to monitor the keyboard space S2, it might be advantageous to install the camera system 20 centered at the bottom of the CV-FTIR system 110. Such an installation is illustrated in FIG. 8B. It should be reiterated the CV-FTIR system 110 may include two or more camera systems 20, which e.g. may be arranged to at least partly monitor different subsets of the space in front of the panel 1. For example, it may be advantageous for one camera system 20 to mainly monitor the hover control space S3, while another camera system 20 mainly monitors the gesture control space S1 and/or the keyboard control space S2.

Figure 9A:
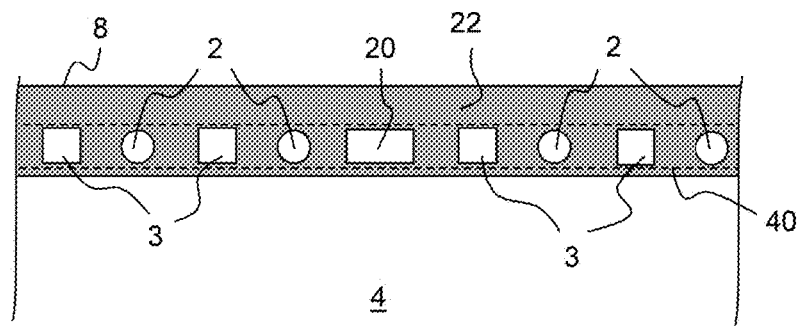
FIGS. 9A-9B are top plan views of a border portion with different integrations of a CV camera.
Figure 9B:
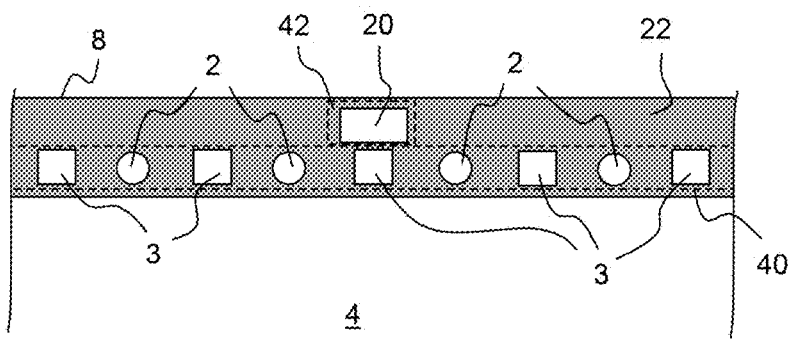

To further exemplify the installation of the camera system 20, FIG. 9A is a top plan view of a border 22 extending from the perimeter of the touch surface 4 to the edge surface 8. The emitters 2 and detectors 3 are arranged on and electrically connected to one or more PCBs 40 which extend beneath the panel 1. Each PCB 40 is coupled to supply power to the components 2, 3 and convey signals to and from the components 2, 3. In FIG. 9A, the line of components 2, 3 includes the camera system 20, which is likewise arranged on and electrically connected to the PCB 40. Thereby, the camera system 20 is installed to make use of the existing infrastructure for power and electrical signaling in the FTIR system part. In FIG. 9B, the camera system 20 is instead installed intermediate the sequence of components 2, 3 and the edge surface 8. The camera system 20 is arranged and electrically connected to a PCB 42, which may or may not be electrically connected to the PCB(s) 40. In a further variant (not shown), the camera system 20 may be installed in line with the emitters 2 and detectors 3, as in FIG. 9A but one a different PCB (cf. 42 in FIG. 9B), which may or may not be electrically connected to the PCB(s) 40.

Figure 10:
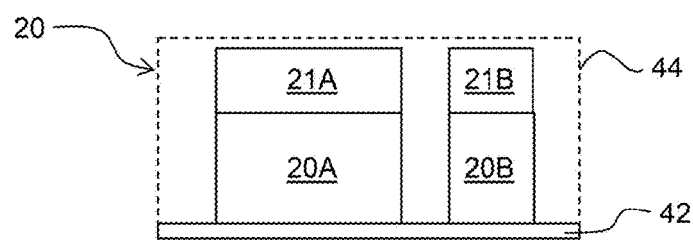
FIG. 10 is a side view of a modular CV camera.

FIG. 10 is a side view of a modular camera system 20 included in the CV system part. In this example, the camera system 20 includes an imager and an illumination device. A housing 44 may encapsulate the imager and the illumination device. The imager comprises a two-dimensional sensor 20A, e.g. a CCD sensor or a CMOS sensor, and an optical lens 21A that defines the scene imaged onto the sensor 20A (taking into account refraction in the panel 1). Likewise, the illumination device comprises a light emitter 20B for generating illuminating light and a lens 21B for directing the illuminating light onto the scene. The sensor 20A and the light emitter 20B are arranged on a common substrate, which may be a PCB 42.

Figure 11:
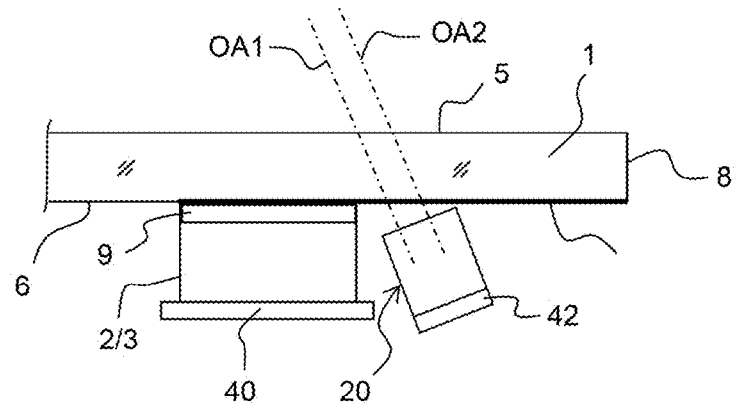
FIG. 11 is a part view of a CV-FTIR system with a tilted CV camera.

The camera system 20 defines an optical axis for the imager and an optical axis for the illumination device, if present. The camera system 20 may be configured such that its optical axes are essentially perpendicular to the rear surface 6 when the camera system 20 is installed in the CV-FTIR system. This may facilitate both manufacture and installation of the camera system 20. However, it may be desirable to arrange the optical axes non-perpendicularly to the panel surfaces 5, 6, e.g. to improve the view of the hover control space S3. Such an installation is shown in FIG. 11, which is a side view taken from the right in FIG. 9B with dashed line OA1 representing the optical axis of the imager and dashed line OA2 representing the optical axis of the illumination device. In an alternative configuration (not shown), the camera system 20 is designed with properly tilted optical axes when the substrate 42 is arranged parallel to the rear surface 6. Such a camera system may be used in either of the installations in FIG. 9A and FIG. 9B.

The depth information determined by the CV system part, such as the above-mentioned depth image, generally represents the distance from the camera system 20 to objects in the scene. To facilitate both the mapping of objects to control spaces S1-S3 and the tracking of objects, it might be advantageous to convert this depth information into a set of distances from individual positions on the touch surface to objects in the scene. This type of coordinate transformation has been found to be particularly relevant for the ability to track hover and gestures really close to the screen, e.g. in space S3 (FIG. 5B). The coordinate transformation may also make is easier for the CV-FTIR system to detect when touching objects are lifted from the touch surface ("touch up"), as discussed below with reference to FIG. 14D.

Figure 12A:
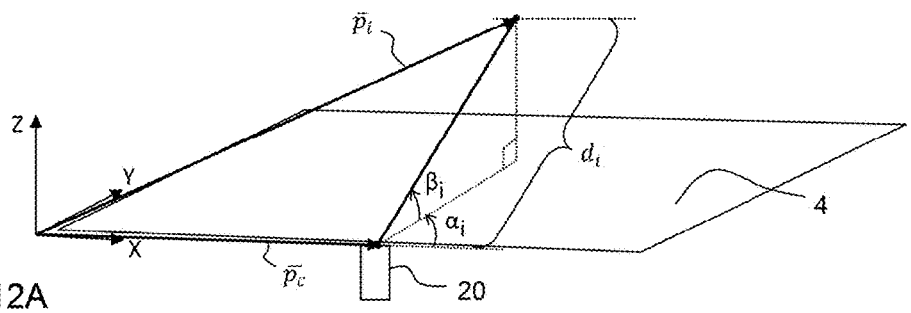
FIGS. 12A-12B illustrate coordinate transformation and projection using depth data from a CV camera.

The coordinate transformation may be achieved in many different ways. One example will be described with reference to FIGS. 12A-12B. Each pixel, i, in the depth image represents the distance to the nearest object within the field of view of this pixel. Each pixel corresponds to a 3D position given by a polar coordinate system. For example, as shown in FIG. 12A, the main line of sight of each pixel may be defined by two angles, $\alpha_i$ and $\beta_i$. The first angle, $\alpha_i$, represents the azimuth and the second angle, $\beta_i$, represents the elevation. If pixel i has depth value $d_i$, it is possible to associate this pixel with a point $\bar{p}_i$ in a common Cartesian coordinate system (XYZ) of the touch surface 4, where Z is a direction perpendicular to the touch surface 4. In a first transformation step, the depth value of each pixel $d_i$ is converted into a position $\bar{p}_i$ in the Cartesian coordinate system:

$$\bar{p}_i = \bar{p}_c + d_i \cdot (\cos \alpha_i \cdot \cos \beta_i, \sin \alpha_i \cdot \cos \beta_i, \sin \beta_i)$$

where $\bar{p}_c$ is the position of the camera system 20 in the Cartesian coordinate system. The resulting set of points $\bar{p}_i$, one for each pixel in the depth image, thus defines a set of 3D positions in the Cartesian coordinate system of the touch surface 4.

Figure 12B:
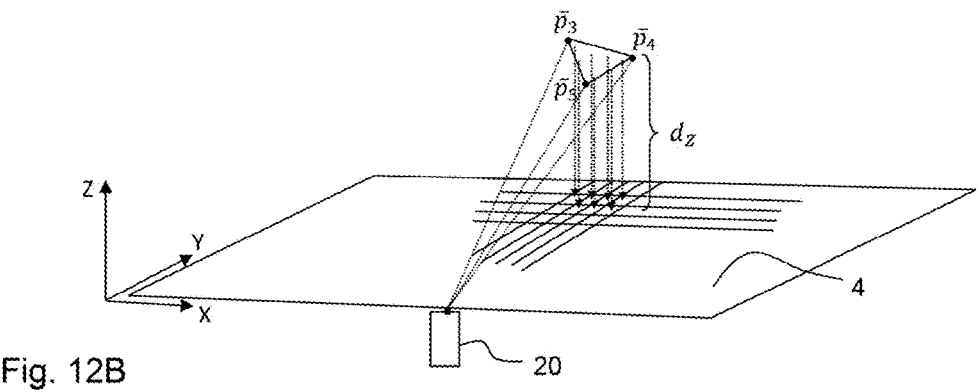

A second transformation step may be implemented to determine a distance from individual cells on the touch surface 4 in the Z direction. A subset of the cells is schematically indicated in FIG. 12B. The cells may e.g. represent individual display pixels of an underlying display. The second transformation step, exemplified in FIG. 12B, involves defining the 3D distance contour for the scene and projecting this contour onto the cells. For example, the contour may be defined by virtually connecting neighboring points $\bar{p}_i$ (exemplified by points $\bar{p}_3$, $\bar{p}_4$ and $\bar{p}_5$) into triangles and, as indicated by vertical arrows in FIG. 12B, performing an orthographic projection of each triangle onto the touch screen 4. A distance value $d_Z$ for each display pixel is obtained by calculating the distance from the cell to a projected point on the triangle. Thus, the second transformation step results in a translated depth image $d_Z(X,Y)$, where X and Y are Cartesian coordinates on the touch surface 4.

It should be understood that the CV system part may operate to identify certain control functions based on the non-transformed depth values $d_i$, while other control functions are identified based on transformed coordinates, given as $\bar{p}_i$ or $d_Z(X,Y)$. For example, objects located at greater distance from the touch surface 4 (e.g. in space S1) may be identified and tracked using the non-transformed depth values $d_i$, while objects located close to the touch surface may be identified and tracked using transformed coordinates. It is also to be understood that all or certain control spaces S1-S3 may be defined with respect to the camera system 20 or the coordinate system XYZ, or both.

Figure 13A:
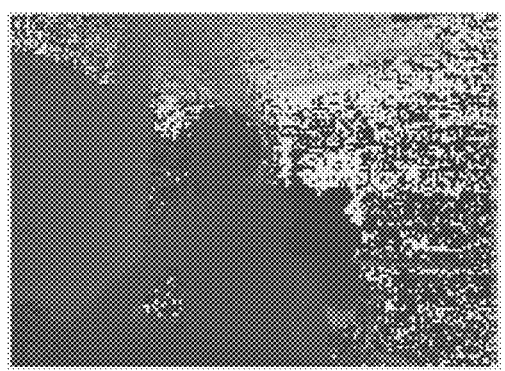
FIGS. 13A-13D illustrate example images generated in a CV system during object detection.
Figure 13B:

Techniques for detecting and tracking objects will now be briefly described with reference to FIGS. 13A-13D. FIG. 13A is a depth image generated by a TOF camera system. In the depth image, brighter shades correspond to larger distances and gray/black corresponds to smaller distances. The scene depicts a user pointing two finger tips towards the touch surface. As a first step, the depth image may be processed for noise suppression, e.g. using conventional low-pass filtering. It is also conceivable to validate the pixels in the depth image based on a digital grayscale image of the scene, if available. In this validation, a pixel is designated as invalid (excluded from processing) if the signal strength (intensity value) of a corresponding pixel in the grayscale image falls below a threshold value. Such a grayscale image is shown in FIG. 13B. By comparing FIGS. 13A and 13B, it is seen that noisy parts of the depth image correlate with dark areas in the grayscale image.

Figure 13C:
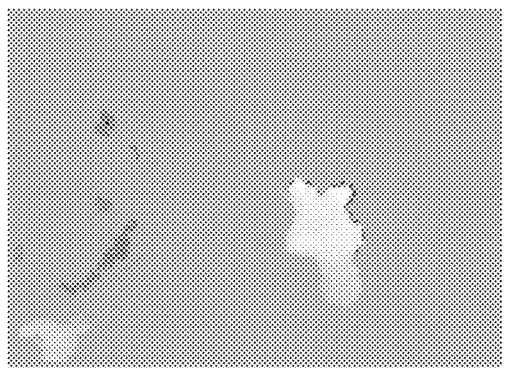

A second step involves foreground extraction, which aims at distinguishing potentially relevant objects (foreground) from non-relevant objects (background) in the scene. This may be done in several different ways. One example is background tracking using exponential forget algorithms, in which the foreground is found by subtracting the background from the depth image. Another example is to use differential images, to detect changes between images over time. Based on the temporal change, gestures may be tracked. Yet another example is to use a modified Stauffer-Grimson background estimation. Unlike the conventional Stauffer-Grimson algorithm, which operates on grayscale images and selects the background using the Gaussians with the most weight, the modified algorithm selects the Gaussians with the greatest depth when assembling the background. All of the foregoing examples may include special handling of invalid pixels. FIG. 13C illustrates the depth image in FIG. 13A after foreground extraction.

Figure 13D:
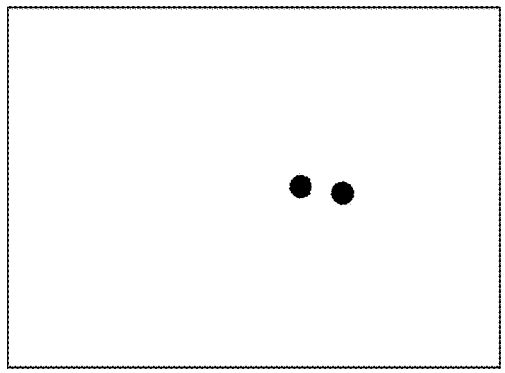

A third step involves detecting and tracking objects in the foreground. This step may be implemented in different ways, e.g. depending on the type of object and/or the type of gesture. For example, the detection/tracking process may apply constraints including an object count (e.g. a minimum and/or maximum number of objects), a size of the respective object, a location of the respective object (e.g. distance to the touch screen), an orientation of the respective object, a movement history for the respective object, and an inter-object distance (distance between objects). For example, to detect fingertips, the foreground may be processed for identification of one or more comparatively circular objects having a reasonable size and being located within a certain distance from the touch screen. FIG. 13D shows two fingertips (black circles) detected in the foreground of FIG. 13C. To start tracking a gesture, it may also be required that the hand/fingers have a certain orientation, e.g. that the fingers are pointed towards the touch screen. As a further example, tracking of a gesture in the gesture control space S1 may require presence of at least two fingertips, to avoid tracking random objects that are moved in front of the touch surface. As a further example, tracking of a gesture may require the object(s) to exhibit a movement history of remaining comparatively stationary for a time period before starting to move, e.g. 50-150 ms.

FIGS. 14A-14H are flow charts that illustrate different control processes that may be implemented in a host device with a CV-FTIR system. The control processes may be executed by one or more controllers in the host device. In the following, reference is made to "the controller" although it is to be understood that different controllers may execute the different control processes, or different steps within a single control process.

Figure 14A:
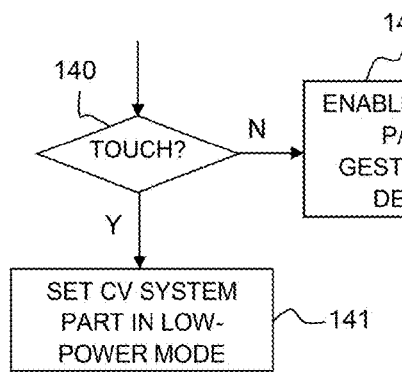
FIGS. 14A-14H are flow charts of different control processes enabled by the CV-FTIR system.

In FIG. 14A, the controller determines whether the FTIR system part indicates presence of at least one touch on the touch surface (step 140). If a touch is present, the controller sets the CV system part in a low-power mode (step 141), e.g. by reducing its repetition rate (cf. FIG. 6). If no touch is present, the controller switches the CV system part to a high-power mode and enables it for detection of control gestures and/or hover. This control process may serve to reduce power consumption.

Figure 14B:
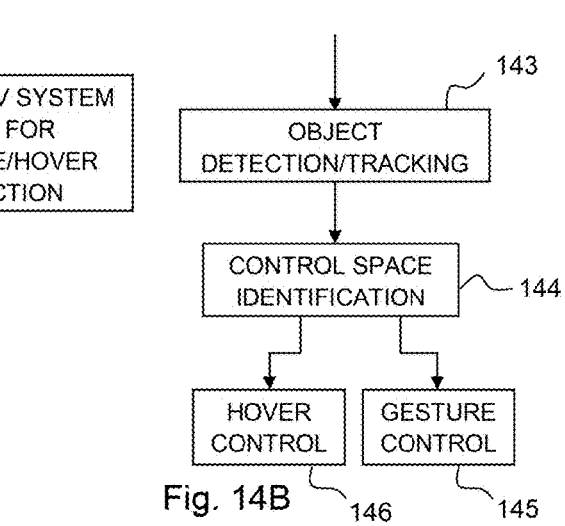

In FIG. 14B, the controller operates the CV system part to detect/track objects (step 143) and identify the control space in which one or more objects are located (step 144). Depending on control space, the controller initiates either a dedicated process for detection of control gestures (step 145) or a dedicated process for detection of hover (step 146). This control process may increase the interaction capabilities.

Figure 14C:
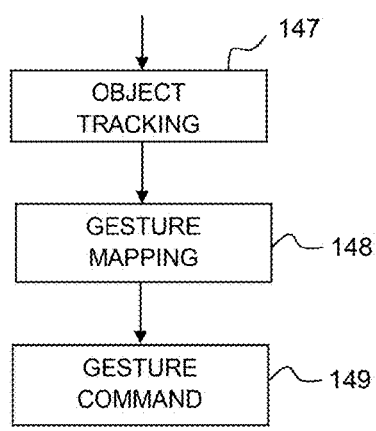

In FIG. 14C, the controller operates the CV system part to track objects (step 147), to match the movement patterns of the tracked objects to a set of predefined gestures (step 148), and to generate a gesture command associated with one of the predefined gestures if the movement pattern matches this gesture (step 149). This control process enables general gesture control.

Figure 14D:
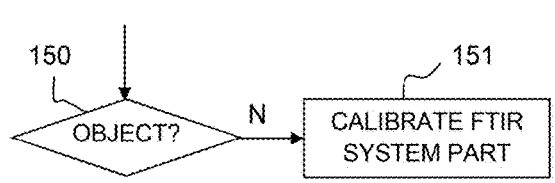

In FIG. 14D, the controller determines whether the CV system part indicates absence of objects in contact with the touch surface, e.g. by verifying absence of objects in the hover space S3 (step 150). If no object is present, the controller verifies the absence of objects to the FTIR system part, which then may initiate a calibration procedure (step 151). The FTIR system part is typically responsive not only to touches, but also to deposits on the touch surface, including fingerprints, smear, sweat, saliva, spilled liquid, etc. Thus, unless measures are taken, the deposits will show up in the attenuation pattern (FIG. 3) and may be mistaken for touches. The calibration procedure allows the FTIR system part to determine the influence of deposits, since an attenuation pattern generated during the calibration procedure is solely attributable to deposits. This control process uses the CV system part to improve the performance of the FTIR system part.

Figure 14E:
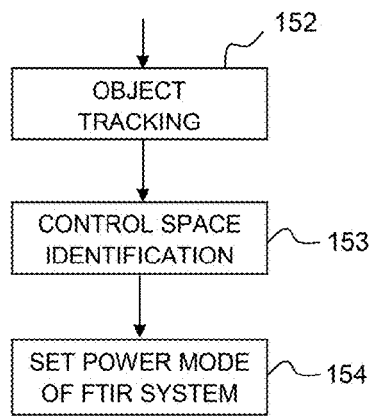

In FIG. 14E, the controller operates the CV system part to detect objects (step 152) and identify the control space in which one or more objects are located (step 153). The controller then sets the power mode of the FTIR system part based on the identified control space (step 154). For example, if objects are only located in the gesture control space S1, the FTIR system part may be set in a low-power mode, e.g. by reducing its repetition rate (cf. FIG. 6) since it is unlikely for a touch to be detected on the touch surface. If one or more objects are found in the hover control space S3, the FTIR system part may be switched to a high-power mode, to reduce any latency in detecting touches. Step 153 may also involve checking the movement of the object(s). If an object in the gesture control space S1 is moved (rapidly) towards the touch screen, the FTIR system part may be set in a high-power mode by step 154. This control process serves to reduce power consumption.

Figure 14F:
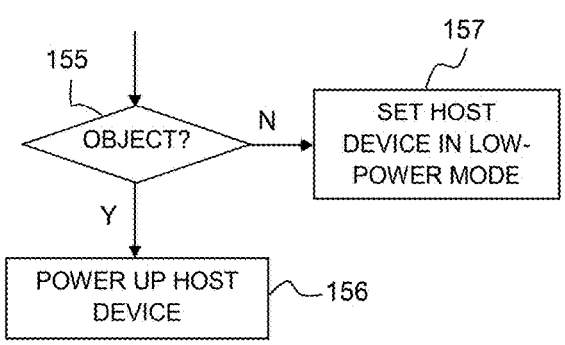

In FIG. 14F, the controller determines whether the CV system part indicates absence of objects within the scene, or within a particular control space (step 155). If no object is present, the controller sets the host device in a low-power mode (step 157). If an object appears, the controller switches the host device to a high-power mode (step 156). This control process serves to reduce power consumption.

Figure 14G:
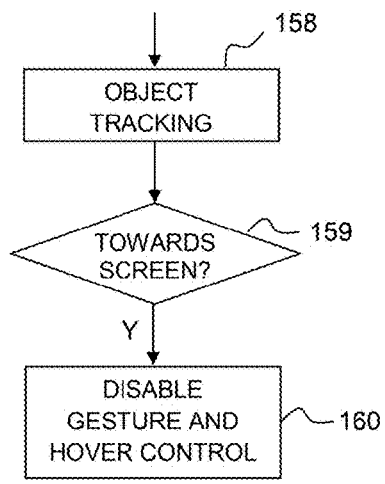

In FIG. 14G, the controller operates the CV system part to detect and track objects and determine their movement direction and optionally their speed (step 158). If one or more objects is found to move towards the touch surface, optionally with a sufficient speed (step 159), the controller disables the gesture control, and possibly the hover control (step 160). Thereby, it is ensured that gesture commands are not generated by the CV-FTIR system when a user reaches towards the host device, e.g. to touch the touch surface or to otherwise manipulate the host device.

Figure 14H:
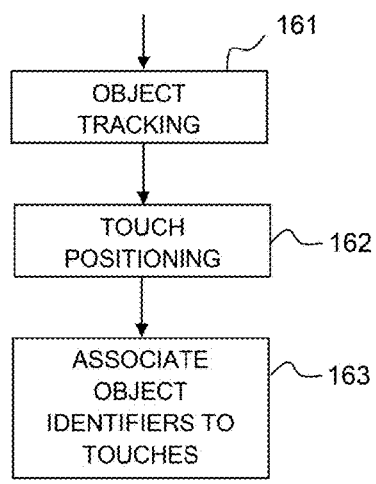

In FIG. 14H, the controller operates the CV system part to detect and track objects (step 161), in particular near the touch surface, e.g. in the hover control space S3. The controller further operates the CV system part to discriminate between different objects and/or between different users of the objects, and assign unique identifiers to different objects/users. For example, the CV system part may be operated to determine how many users are using the host device and where they are located in relation to the touch surface. Concurrently with step 161, the controller operates the FTIR system part to detect and track touches on the touch surface (step 162). The controller further associates the movement of different touches on the touch surface with the unique identifiers (step 163), e.g. by matching the location of the different objects/users given by the CV system part with the location of touches on the touch surface given by the FTIR system part. For example, the controller may track the positions of the users and follow their respective arm and hand movements so as to associate their respective identifier with a touch movement on the touch surface. This control process enables collaborative use of the host device and may also be useful for gaming and gambling applications.

Figure 15:
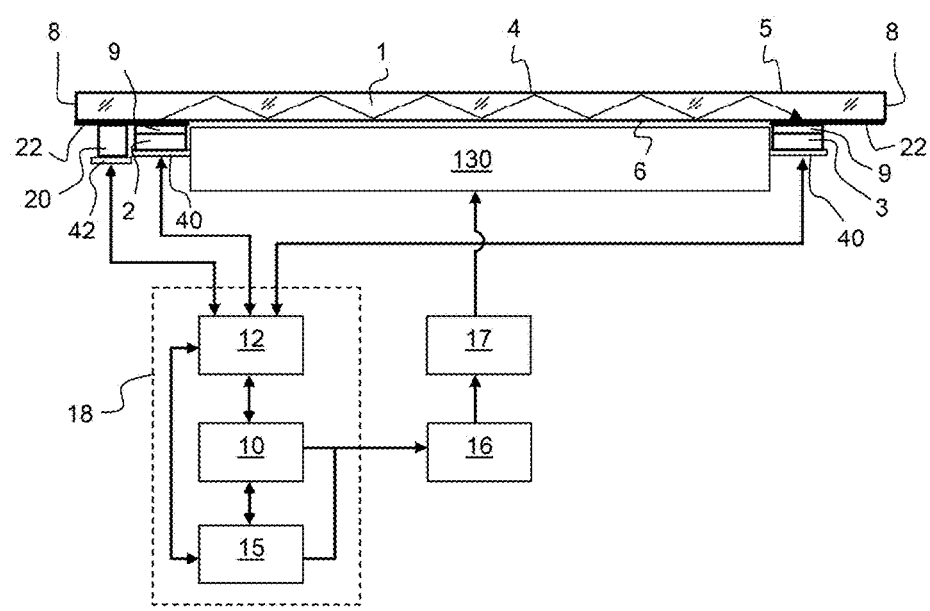
FIG. 15 is a side view of an CV-FTIR system.

FIG. 15 shows an example of a CV-FTIR system integrated in a host device. A display device 130 is disposed beneath the panel 1 in alignment with and visible through the touch surface 4. The emitters 2 and detectors 3 of the FTIR system part are disposed at the perimeter of the touch surface 4 and are operable to propagate light across the touch surface 4 inside the panel 1. The camera system 20 of the CV system part is disposed to view a scene above the touch surface 4 through the panel 1. Details about the optical configuration and the control of the CV-FTIR system have already been given elsewhere herein and will not be repeated.

The CV-FTIR system comprises an activation controller 12 which is connected to control the activation of the emitters 2 and detectors 3, as well as the camera system 20.

A touch controller 10 is connected to receive, from the activation controller 12, projection signals representing the light received by light detectors 3. The touch controller 10 is configured to determine touch data for touches on the touch surface 4, based on the projection signals. As indicated by a double-ended arrow, the touch controller 10 may be further operable to supply control signals to the activation controller 10, e.g. for changing the activation rate or the number of activated emitters/detectors for power-saving reasons. A CV controller 15 is connected to receive, from the activation controller 10, images of the scene viewed by the camera system 20. The CV controller 15 is configured to process the images for object detection and tracking and for gesture identification. As indicated by a double-ended arrow, the CV controller 15 may be further operable to supply control signals to the activation controller 12, e.g. for controlling the activation rate of the camera system 20. The touch controller 10 and the CV controller 15 are connected to a main controller 16, which may be configured to control the overall operation of the host device. The main controller 16 is connected to a display controller 17 which is configured to generate the user interface on the display device 130 based on control signals from the main controller 16. The main controller 16 is thereby operable to coordinate the user interface on the display device 130 with the data from the CV-FTIR system, e.g. touch data from the touch controller 10 and information about invoked gesture commands from the CV controller 15. As indicated by a double-ended arrow, the CV controller 15 may be able to communicate with the touch controller 10, e.g. as part of the control processes shown in FIGS. 14A, 14D and 14E.

Although the controllers in FIG. 15 are shown as physically separate units, they may be combined in hardware as desired. For example, as indicated by a dashed line, the controllers 10, 12 and 15 may be implemented as a combined controller 18 which is installed in the host device and connected to the main controller 16. In another example (not shown), the activation controller 10 is separated into one activation controller for the camera system 20 and one activation controller for the emitters 2 and detectors 3.

It should also be noted that the arrows in FIG. 15 do not imply any specific communication or signaling paths between the controllers but merely illustrate how data may be transferred to and from the controllers.

Each of the controllers 10, 12, 15, 16, 17 as well as the combined controller 18, may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, and serve as another element/means when executing another instruction. In addition, one element/means may be implemented by one instruction in some cases, but by a plurality of instructions in other cases. The controller 10, 12, 15, 16, 17, 18 may include or consist of one or more processing units (cf. 14 in FIG. 2), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The controller 10, 12, 15, 16, 17, 18 may further include a system memory (cf. 13 in FIG. 2) and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software as well as data structures, parameters and variables that are used during operation of the CV-FTIR system may be stored or defined in the system memory, or on other removable/non-removable volatile/non-volatile computer storage media which is included in or accessible to the controller 10, 12, 15, 16, 17, 18, such as magnetic media, optical media, flash memory cards, digital tape, solid state RAM, solid state ROM, etc. The controller 10, 12, 15, 16, 17, 18 may include one or more communication interfaces, such as a serial interface, a parallel interface, a USB interface, a wireless interface, a network adapter, etc, as well as one or more data acquisition devices, such as an A/D converter. The special-purpose software may be provided to the controller 10, 12, 15, 16, 17, 18 on any suitable computer-readable medium, including a record medium, or a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the FTIR system part may be replaced with any other touch-sensing system that has a touch sensor arrangement capable of being associated with or integrated in a light transmissive panel so as to be responsive to touches within a touch-sensing region on the front surface. Many of the foregoing structural and functional implementation examples, including the control processes in FIGS. 14A-14H, are equally applicable when such a general touch-sensing system is combined with a CV system part as described. For example, the touch sensor arrangement may comprise resistive wire grids, capacitive sensors or strain gauges which are incorporated into or attached to the panel. Alternatively, the touch sensor arrangement may comprise light emitters and light detectors that define a grid of light propagation paths above the front surface of the panel. Alternatively, the touch sensor arrangement may comprise a camera disposed beneath the panel to detect light scattered by objects in contact with the front surface. Alternatively, the touch sensor arrangement may be configured to propagate ultrasound or surface acoustic waves in the panel for touch sensing.

The invention claimed is:

1. A touch-sensitive apparatus, comprising:
   a touch surface;
   a touch sensor arrangement configured to be responsive to touches within a touch-sensing region on the touch surface;
   a touch controller configured to determine a location of a touch within the touch-sensing region based on signal data from the touch sensor arrangement;
   a camera system configured to image a scene located external to the touch-sensitive apparatus; and
   a computer vision controller configured to detect at least one object within the scene based on image data generated by the camera system, discriminate between an object spaced from the touch-sensing region and an object in contact with the touch-sensing region, and output a position of a touch of the object on the touch surface when the object is in contact with the touch-sensing region and output a hover control where the object is spaced from the touch-sensing region, wherein the touch-sensitive apparatus is further configured to match a position of the object in contact with the touch-sensing region, as determined by the computer vision controller, with the location of the touch in the touch-sensing region, as determined by the touch controller, and wherein the touch-sensitive apparatus is further configured to assign a unique identifier to at least one of the at least one object or a user of the at least one object, said user being detected by the computer vision controller.

2. The touch-sensitive apparatus of claim 1, wherein the computer vision controller is further configured to determine a position of the at least one object in three dimensions external to the touch-sensitive apparatus.

3. The touch-sensitive apparatus of claim 2, wherein
the computer vision controller is further configured to match the position of the at least one object to one or more control spaces with an extent external to the touch-sensitive apparatus, and
said one or more control spaces include a proximity control space, which overlaps at least part of the touch-sensing region and extends no more than 50 mm from the touch surface.

4. The touch-sensitive apparatus of claim 3, wherein the computer vision controller is further configured to associate a movement pattern of the at least one object within the proximity control space with a hover gesture.

5. The touch-sensitive apparatus of claim 3, wherein said one or more control spaces include a gesture control space, which is spaced from the touch surface by at least 50 mm.

6. The touch-sensitive apparatus of claim 5, wherein
the computer vision controller is further configured to associate a movement pattern of the at least one object within the gesture control space with a control gesture for controlling operation of the touch-sensitive apparatus, and
the control gesture is associated with one of
controlling a power setting of the touch-sensitive apparatus, and
interacting with a user interface generated by a display device beneath the touch surface.

7. The touch-sensitive apparatus of claim 3, wherein the touch-sensitive apparatus is further configured to set a power consumption of at least one of the touch controller and the touch sensor arrangement based on the position of the at least one object in relation to the one or more control spaces.

8. The touch-sensitive apparatus of claim 3, wherein the hover control comprises at least the position of the object within the proximity control space.

9. The touch-sensitive apparatus of claim 1, wherein the computer vision controller is further configured to
determine a movement pattern of the at least one object within the scene,
match the movement pattern to a set of gestures, and
generate a gesture command associated with a gesture among the set of gestures.

10. The touch-sensitive apparatus of claim 9, wherein the computer vision controller is further configured to at least one of determine the movement pattern or match the movement pattern to the set of gestures, provided that the at least one object fulfills at least one constraint defined by at least one of a size, a position, an orientation, a movement history, an object count, or an inter-object spacing.

11. The touch-sensitive apparatus of claim 1, wherein the computer vision controller is further configured to
detect that the at least one object is moving towards the touch surface, and
disable a process of detecting gestures based on movement of the at least one object when the at least one object is moving towards the touch surface.

12. The touch-sensitive apparatus of claim 11, wherein the touch-sensitive apparatus is further configured to increase power consumption of at least one of the touch controller and the touch sensor arrangement when the computer vision controller is further configured to detect that the at least one object is moving towards the touch surface.

13. The touch-sensitive apparatus of claim 1, wherein the touch-sensitive apparatus is further configured to decrease power consumption of at least one of the camera system and the computer vision controller if the touch controller indicates presence of a touch within the touch-sensing region.

14. The touch-sensitive apparatus of claim 1, wherein the touch sensor arrangement comprises:
light emitters and light detectors along a perimeter of the touch-sensing region, the light emitters configured to generate light beams that propagate across the touch-sensing region above the touch surface on a plurality of propagation paths to the light detectors, the touch-sensitive apparatus configured such that a touch on the touch surface within the touch-sensing region causes attenuation of light received by the light detectors on one or more of the plurality of propagation paths.

15. The touch-sensitive apparatus of claim 14, wherein
the light emitters and the light detectors are arranged along a border region surrounding the touch-sensing region, as seen in a direction normal to a rear of the touch surface, and
the camera system is arranged within said border region, as seen in the direction normal to the rear of the touch surface.

16. The touch-sensitive apparatus of claim 15, wherein
the border region includes an optical filter, which is configured to transmit at least a portion of light emitted by the light emitters while blocking visible light, and
the camera system is optically coupled to a rear of the touch surface via the optical filter.

17. A method of operating a touch-sensitive apparatus, said method comprising:
operating a touch sensor arrangement to provide signal data representing a touch within a touch-sensing region on a touch surface of a panel;
operating a touch controller to determine a location of the touch within the touch-sensing region based on the signal data;
operating a camera system to image a scene located external to the touch-sensitive apparatus; and operating a computer vision controller to
detect at least one object within the scene based on image data generated by the camera system,
discriminate between an object spaced from the touch-sensing region and an object in contact with the touch-sensing region, and
output a position of a touch of the object on the touch surface when the object is in contact with the touch-sensing region and output a hover control where the object is spaced from the touch-sensing region, matching a position of the object in contact with the touch-sensing region, as determined by the computer vision controller, with the location of the touch in the touch-sensing region, as determined by the touch controller, and assigning a unique identifier to at least one of the at least one object or a user of the at least one object, said user being detected by the computer vision controller.

18. A non-transitory, tangible computer readable storage medium comprising program instructions which, when executed by one or more processors, cause the one or more processors to carry out the method of claim 17.

\* \* \* \* \*